United States Patent
Jeong et al.

(10) Patent No.: US 8,051,264 B2
(45) Date of Patent: Nov. 1, 2011

(54) PORTABLE DEVICE AND METHOD FOR CONTROLLING SHARED MEMORY IN PORTABLE DEVICE

(75) Inventors: Jong-Sik Jeong, Seoul (KR); Se-Jin Kang, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 619 days.

(21) Appl. No.: 12/159,184

(22) PCT Filed: Dec. 21, 2006

(86) PCT No.: PCT/KR2006/005611
§ 371 (c)(1),
(2), (4) Date: Sep. 18, 2008

(87) PCT Pub. No.: WO2007/074999
PCT Pub. Date: Jul. 5, 2007

(65) Prior Publication Data
US 2009/0019248 A1    Jan. 15, 2009

(30) Foreign Application Priority Data
Dec. 26, 2005  (KR) .......................... 10-2005-0129734

(51) Int. Cl.
*G06F 13/10* (2006.01)
(52) U.S. Cl. ....................................................... 711/163
(58) Field of Classification Search .................. None
See application file for complete search history.

(56) References Cited

U.S. PATENT DOCUMENTS

| | | | |
|---|---|---|---|
| 5,297,260 A * | 3/1994 | Kametani | 710/113 |
| 5,329,630 A | 7/1994 | Baldwin et al. | |
| 6,668,308 B2 | 12/2003 | Barroso et al. | |
| 6,965,974 B1 * | 11/2005 | Bays et al. | 711/153 |
| 7,356,654 B2 * | 4/2008 | Fukuzo | 711/149 |
| 2003/0088744 A1 | 5/2003 | Jain et al. | |
| 2005/0144401 A1 * | 6/2005 | Pantalone et al. | 711/151 |

FOREIGN PATENT DOCUMENTS

| | | |
|---|---|---|
| KR | 10-2004-0106778 A | 12/2004 |
| WO | WO-03/085524 A2 | 10/2003 |

OTHER PUBLICATIONS

MT48LC!M16A1 data specification, Micron 1999.*
Design With HyperTransport, HyperTransport Consortium 2004.*

* cited by examiner

*Primary Examiner* — Duc Doan
(74) *Attorney, Agent, or Firm* — Birch, Stewart, Kolasch & Birch, LLP (57) ABSTRACT

A portable terminal and a method of controlling a shared memory, the portable terminal are disclosed. The portable terminal includes a memory unit, being equipped with at least 2 ports and having a storage block partitioned into partitioned blocks in a quantity of n, and a plurality of processors, reading or writing data by accessing a particular partitioned block through each dedicated port. At least one of the partitioned blocks is assigned to a common storage block, accessible by a processor having an access privilege, and the access privilege is transferred between the plurality of processors. The common storage block can be partitioned into k sub partitioned blocks, which the data type and process to be stored are predetermined. With the present invention, in the case of the common storage block for the plurality of processors, by allowing the partitioned storage blocks to be partitioned again into sub partitioned blocks depending on a type of data to be stored, the data processing/transmission speed and efficiency can be optimized.

18 Claims, 7 Drawing Sheets

PRIOR ART

PORTABLE DEVICE AND METHOD FOR CONTROLLING SHARED MEMORY IN PORTABLE DEVICE

CROSS-REFERENCE TO RELATED APPLICATIONS

This application claims foreign priority benefits under 35 U.S.C. .sctn. 119(a)-(d) to PCT/KR2006/005611, filed Dec. 21, 2006, which is hereby incorporated by reference in its entirety.

BACKGROUND

1. Technical Field

The present invention is directed to a portable terminal, more specifically to a portable terminal having a plurality of processors sharing a memory with each other.

2. Description of the Related Art

A portable terminal refers to a compact electronic device that is designed to be easily carried by a user in order to perform functions such as game or mobile communication. A portable terminal can be a mobile communication terminal, a personal digital assistant (PDA) or a portable multimedia player (PMP).

The mobile communication terminal is essentially a device designed to enable a mobile user to telecommunicate with a receiver who is remotely located. Thanks to scientific development, however, the latest mobile communication terminals have functions, such as camera and multimedia data playback, in addition to the basic functions, such as voice communication, short message service and address book.

Figure 1:
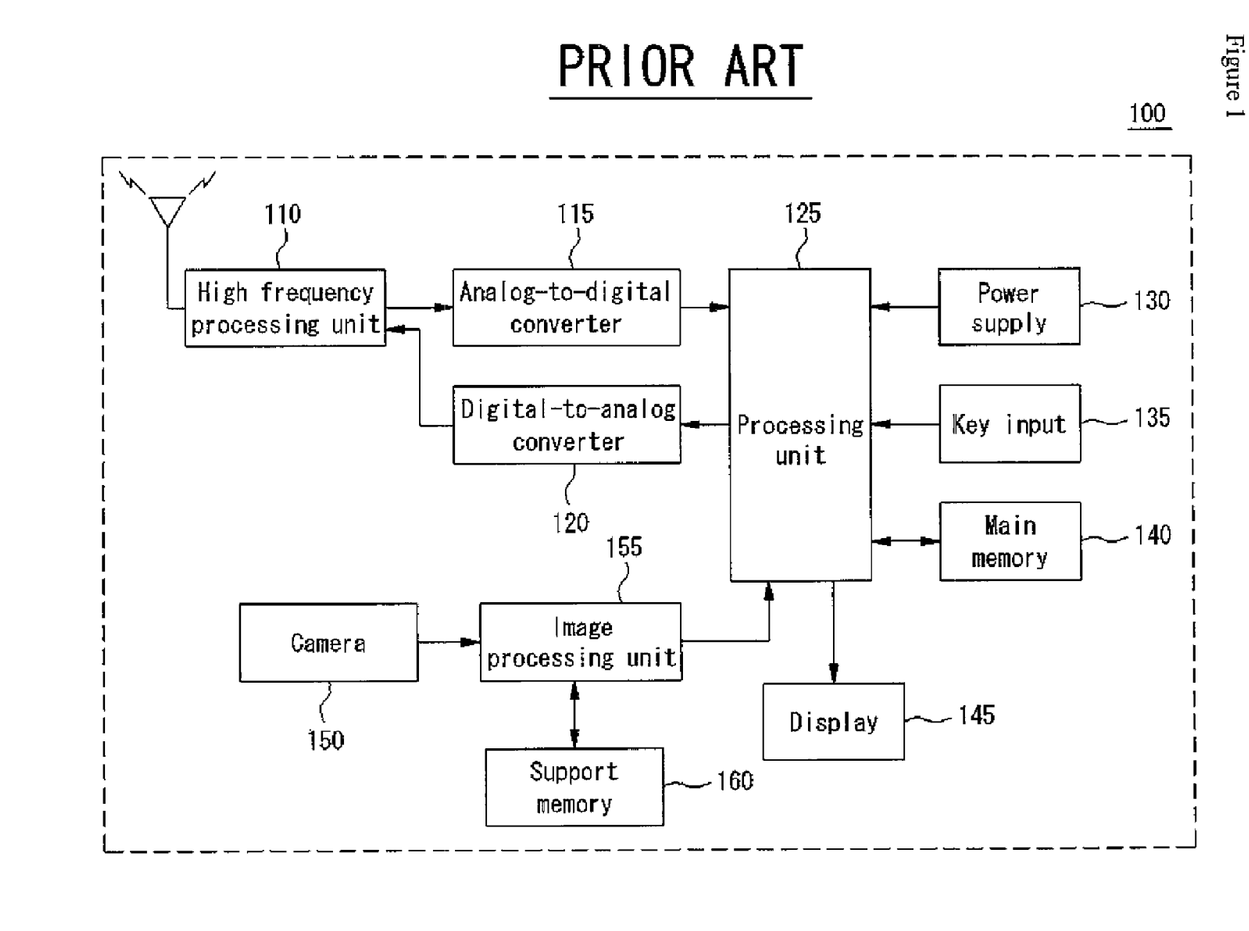
FIG. 1 shows a block diagram of a conventional mobile communication terminal having a camera function.

FIG. 1 shows a block diagram of a conventional mobile communication terminal having a camera function.

Referring to FIG. 1, the mobile communication terminal 100 having a camera function comprises a high frequency processing unit 110, an analog-to-digital converter 115, a digital-to-analog converter 120, a processing unit 125, a power supply 130, a key input 135, a main memory 140, a display 145, a camera 150, an image processing unit 155 and a support memory 160.

The high frequency processing unit 110 processes a high frequency signal, which is transmitted or received through an antenna.

The analog-to-digital converter 115 converts an analog signal, outputted from the high frequency processing unit 110, to a digital signal and sends to the processing unit 125.

The digital-to-analog converter 120 converts a digital signal, outputted from the processing unit 125, to an analog signal and sends to the high frequency processing unit 110.

The processing unit 125 controls the general operation of the mobile communication terminal 100. The processing unit 125 can comprise a central processing unit (CPU) or a microcontroller.

The power supply 130 supplies electric power required for operating the mobile communication terminal 100. The power supply 130 can be coupled to, for example, an external power source or a battery.

The key input 135 generates key data for, for example, setting various functions, controlling the functions or dialing of the mobile communication terminal 100 and sends the key data to the processing unit 125.

The main memory 140 stores an operating system and a variety of data of the mobile communication terminal 100. The main memory 140 can be, for example, a flash memory or an EEPROM (Electrically Erasable Programmable Read Only Memory).

The display 145 displays the operation status of the mobile communication terminal 100 and an external image photographed by the camera 150.

The camera 150 photographs an external image (a photographic subject), and the image processing unit 155 processes the external image photographed by the camera 150. The image processing unit 155 can perform functions such as color interpolation, gamma correction, image quality correction and JPEG encoding. The support memory 160 stores the external image processed by the image processing unit 155.

As described above, the mobile communication terminal 100 having a camera function is equipped with a plurality of processors (i.e. a main processor and one an application processor or more for performing an additional function). In other words, as shown in FIG. 1, the processing unit 125 for controlling general functions of the mobile communication terminal 100 and the image processing unit 155 for controlling the camera function can be processors. Moreover, each processing unit is structured to be coupled with an independent memory.

The application processor can take different forms depending on the kinds of additional functions, with which the portable terminal is equipped. For example, the application processor for controlling the camera function can process functions such as JPEG encoding and JPEG decoding; the application processor for controlling the movie file playback function can process functions such as video file (e.g., MPEG4, DIVX, H.264) encoding and decoding; and the application processor for controlling the music file playback function can process functions such as audio file encoding and decoding. Of course, there can be an application processor that can process various aforementioned functions altogether. Each of these processing units has an individual memory for storing the data processed by the processing unit. Therefore, according to the related art, it is necessary to increase the number of processing units and memories as portable terminals become increasingly multifunctional.

Figure 2:
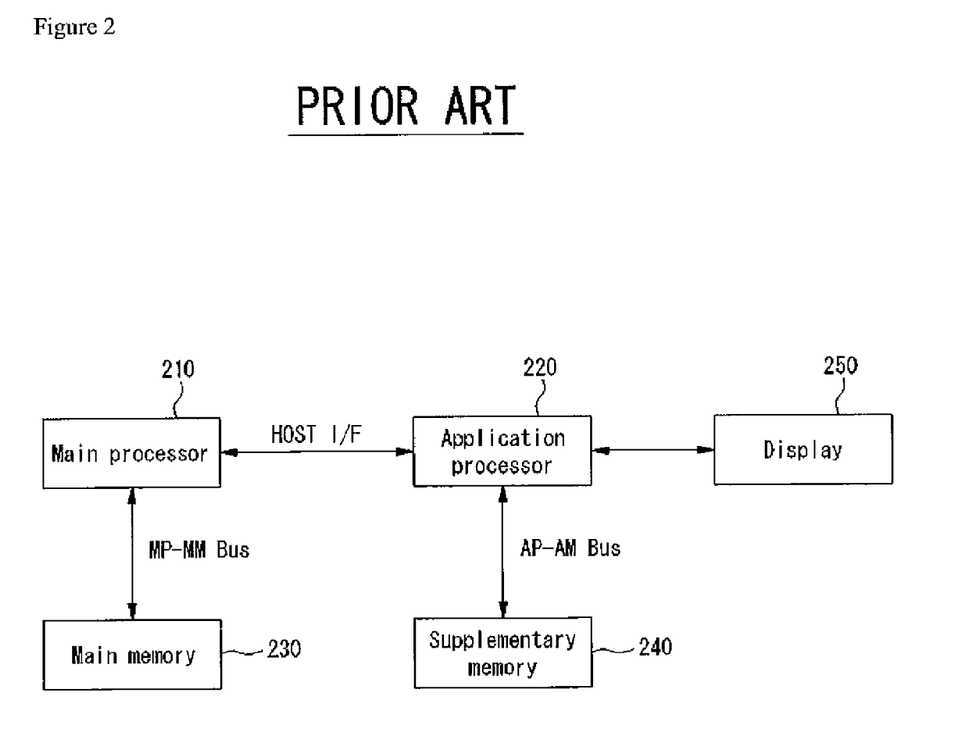
FIG. 2 shows a block diagram of an example of a conventional coupling structure between a main processor, an application processor and each memory.

FIG. 2 illustrates an example of a coupling structure among a main processor, an application processor and their corresponding memories in accordance with the related art.

Referring to FIG. 2, the main processor 210 and the application processor 220 communicate information through a host interface; the main processor 210 is coupled to the main memory 230 through an MP (main processor)-MM (main memory) bus; and the application processor 220 is coupled to the supplementary memory 240 through an AP (application processor)-AM (application memory) bus. A bus refers to a common-purpose electric pathway that is used to transmit information between the processor, the main memory and the input/output in a device such as a computer. The bus comprises a line for data, designating the address of each device or the location of the memory, and a line for distinguishing a variety of data transmission operation to be processed.

As illustrated in FIG. 2, each of the processors 210 and 220 is independently coupled to each of the memories 230 and 240. Accordingly, depending on the operation that is currently running, the main processor 210 reads data stored in the main memory 230 and transmits the data to the application processor 220 through the host interface or receives data stored in the supplementary memory 240 by requesting the application processor 220.

In other words, in case a certain process operation is to be processed in the main processor 210 and the application processor 220, respectively, in order to process certain data, the main processor 210 first accesses the main memory 230 to perform a necessary operation and then transmits the processed data to the application processor 220, and the application processor 220 re-processes the received data and stores the data in the supplementary memory 240. Then, the application processor 220 transmits the data stored in the supplementary memory 240 back to the main processor 210 to have it stored in the main memory 230.

In this case, the larger the amount of data is communicated between the main processor 210 and the application processor 220, the more time each of the processors 210 and 220 has to spend on the operation (i.e. memory access, host interface operation) requested by the other processor rather than the operation of its own process.

This problem causes a bottleneck in data communication between the main processor 210 and the application processor 220 as the amount of data to be processed and the functions performed by the portable terminal increase.

As a result, the problems described above weaken the overall performance of a multi-function portable terminal.

SUMMARY

In order to solve the problems described above, the present invention also provides a portable terminal and a method of controlling a shared memory, for the portable terminal, that can optimize the operation speed of each processor by allowing storage areas of the shared memory to be partitioned into a plurality of partitioned blocks to be accessed by a plurality of processors.

The present invention also provides a portable terminal and a method of controlling a shared memory, for the portable terminal, that can optimize the data processing/transmission speed and efficiency by allowing storage areas of the shared memory to be partitioned in units of bank, in the case of a common storage block for a plurality of processors, by allowing the partitioned storage blocks to be partitioned again into sub partitioned blocks depending on a type of data to be stored.

The present invention also provides a portable terminal and a method of controlling a shared memory, for the portable terminal, that can allow each processor to handle its dedicated process only to optimize the operation speed and efficiency of each processor by allowing storage areas of the shared memory to be partitioned into a plurality of partitioned blocks to be accessed by a plurality of processors.

The present invention also provides a portable terminal and a method of controlling a shared memory, for the portable terminal, that can process data highly efficiently by eliminating the loss of time needed to communicate the data, stored in a specific memory, between processors.

The present invention also provides a portable terminal and a method of controlling a shared memory, for the portable terminal, that can minimize the number of pins for the connection between the main processor and the application processor. The present invention also provides a portable terminal and a method of controlling a shared memory, for the portable terminal, that can easily maintain a data value stored in the common area when a plurality of processors share one memory.

Other objects of the present invention will become apparent through the preferred embodiments described below.

To achieve the above objects, an aspect of the present invention features a portable terminal having a plurality of processors sharing a memory with each other.

According to an embodiment of the present invention, the portable terminal includes a memory unit, being equipped with at least 2 ports and having a storage block partitioned into partitioned blocks in a quantity of n, and a plurality of processors, reading or writing data by accessing a particular partitioned block through each dedicated port. At least one of the n partitioned blocks is assigned to a common storage block, accessible by a processor having an access privilege, and the access privilege is transferred between the plurality of processors. The common storage block can be partitioned into k sub partitioned blocks, for which the data type and process to be stored are predetermined.

Data maintaining operation of the data written in the common storage block can be performed by the processor having the access privilege. Here, the operation of maintaining data can have precharge and refresh.

The plurality of processors has a main processor and at least one application processor, processing data written in a partitioned block in accordance with a process instruction of the main processor. The main processor and the application processor can be coupled to each other via a host interface.

The partitioned block can be set in units of bank, and an independent bank address can be assigned to each of the sub partitioned blocks. In this case, the main processor can transmit the bank address of the sub storage block, where the data is stored, to the application processor, immediately before or after writing data in a particular sub storage block.

Alternatively, the application processor can be equipped with a block pointing register, and the main processor can write a value corresponding to the sub partitioned block, where the data is written, in the block pointing register, immediately before or after writing the data, and the application processor can process the data written in the sub partitioned block according to a preset process.

The host interface can be a serial interface. Pins for the serial interface can have a first pin, communicating a control command between the main processor and the application processor, a second pin, checking a response signal or a setting status between the main processor and the application processor, a third pin, for synchronization clock with serial data, a fourth pin, indicating a valid data communication section, and a fifth pin, for the application processor to request the main processor for transfer or assignment of the access privilege.

The main processor can renew a register value in the application processor to a predetermined value, via the host interface, in order to request transfer or assignment of the access privilege.

One processor that is already accessed to the common storage block can determine whether to immediately transfer the access privilege in accordance with a predetermined priority or to transfer the access privilege after completing the corresponding process in the case of receiving the request of the transfer of the access privilege from the other processor.

Each of the plurality of processors can be pre-assigned with at least one of the partitioned blocks in the quantity of n as an exclusive area.

In order to achieve the above objects, another aspect of the present invention features a method of sharing a memory among a plurality of processors and/or a recorded medium recording a program executing the method thereof.

A method of sharing a memory between a plurality of processors in a portable terminal includes a main processor obtaining a privilege to access a common storage block; the main processor accessing a sub partitioned block of the common storage block to read or write data and terminating the access after completing reading or writing the data; the application processor, having the access privilege, accessing the sub partitioned block; and the application processor reading the data written in the sub partitioned block and processes the read data in accordance with a predetermined processing operation, whereas a memory unit, having a plurality of ports to be individually coupled to the plurality of processors, can have a storage area partitioned to blocks in a quantity of n, and at least one of the partitioned blocks in the quantity of n can be assigned as a common storage area, accessible by a processor having the access privilege, and the processor having the access privilege can perform an operation of maintaining the data stored in the common storage area.

The main processor and the application processor can be coupled to each other through a host interface, which is a serial interface. Here, pins for the serial interface can have a first pin, communicating a control command between the main processor and the application processor, a second pin, checking a response signal or a setting status between the main processor and the application processor, a third pin, for synchronization clock with serial data, a fourth pin, indicating a valid data communication section, and a fifth pin, for the application processor to request the main processor for transfer or assignment of the access privilege.

The partitioned block can be set in units of bank, and an independent bank address can be assigned to each of the sub partitioned blocks. The main processor can transmit the bank address of the sub storage block, where the data is stored, to the application processor, immediately before or after writing data in a particular sub storage block.

The application processor can be equipped with a block pointing register, and the main processor can write a value corresponding to the sub partitioned block, where the data is written, in the block pointing register, immediately before or after writing the data, and the application processor can process the data written in the sub partitioned block according to a preset process.

DETAILED DESCRIPTION

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 3:
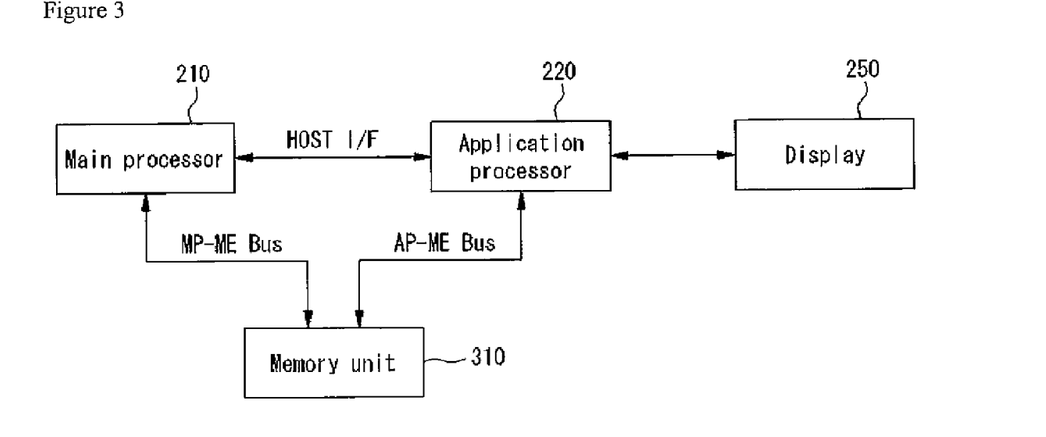
FIG. 3 shows a block diagram of a coupling structure between a main processor, an application processor and a memory unit, in accordance with an embodiment of the present invention.
Figure 4:
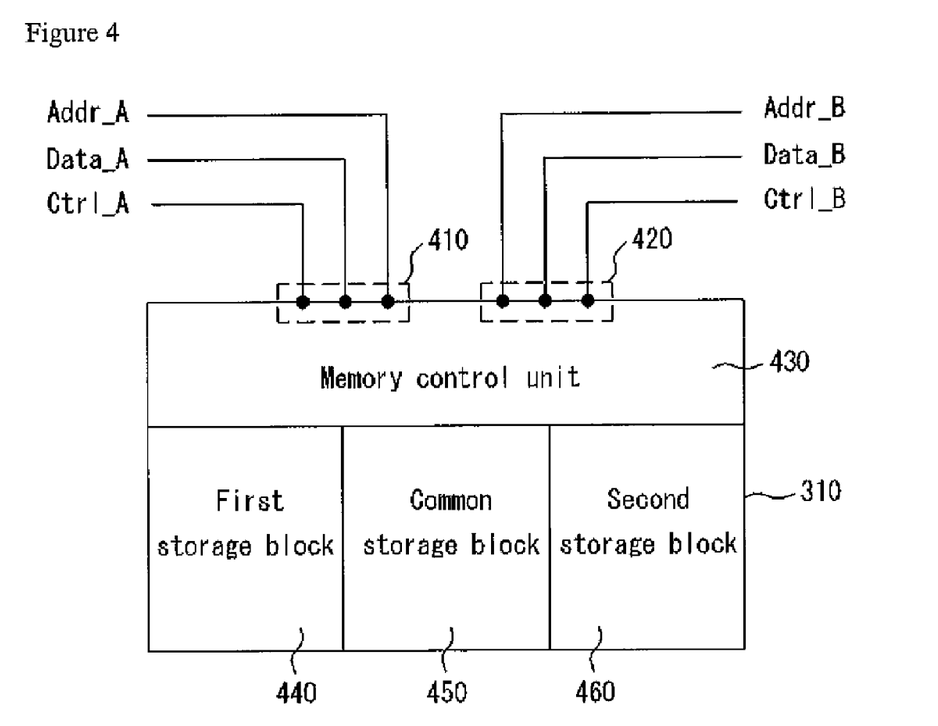
FIG. 4 shows the conceptual diagram of how the storage block of the memory unit is partitioned in accordance with an embodiment of the present invention.
Figure 5:
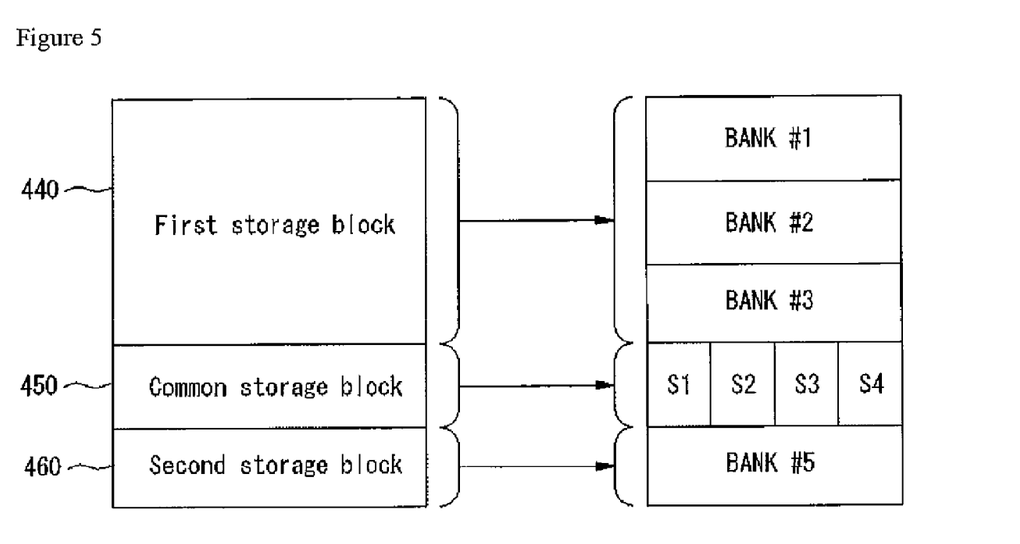
FIG. 5 shows the partitioned state of the storage block of a memory unit in accordance with an embodiment of the present invention.

FIG. 3 shows a block diagram of a coupling structure between a main processor, an application processor and a memory unit, in accordance with an embodiment of the present invention, and FIG. 4 shows the conceptual diagram of how the storage block of the memory unit is partitioned in accordance with the embodiment of the present invention. FIG. 5 shows the partitioned state of the storage block of the memory unit in accordance with the embodiment of the present invention.

Referring to FIG. 3, the main processor 210 and the application processor 220 transmit and receive data through a host interface. The data communicated through the host interface can include one or more of, for example, a process command, status information, a control command, a response signal (Ack), a process completion response and confirmation information of operation/setting status of another processor.

The main processor 210 and the memory unit 310 communicate data through the MP-ME bus, and the application processor 220 and the memory unit 310 communicate data through the AP-ME bus. A bus refers to a common-purpose electric pathway that is used to transmit information between the processor, the main memory and the input/output in a device such as a computer.

Two elements or more of the main processor 210, the application 220 and the memory unit 310 can be realized as one chip. For example, a plurality of processors including the main processor 210 and the application 220 can be realized as one chip. Any one processor and the memory unit 310 can be alternatively equipped within one chip. Of course, it is evident that the plurality of processors and at least one memory can be embodied as one chip.

The main processor 210 can control the general operation of the portable terminal. Also, the application processor 220 can be a dedicated processor for processing the MPEG4, 3-D graphic, camera and MP3 file playback functions. The operation of the application processor 220 can be controlled by the main processor 210. A peripheral device such as a display 250 can be coupled behind the application process 220. The type of data to be outputted through the display 250, for example, can be controlled by the main processor 210 or the application processor 220. For example, the application processor 20 can allow to be displayed through the display 250, data received from the main processor 210 or data processed by the application processor 220.

The memory unit 310 is structured to be shared by a plurality of processors coupled to the memory unit 310, and must have access ports corresponding to the number of processors being equipped with the portable terminal or sharing the memory unit 310. Although the present description assumes that the memory is a dual port memory having two access ports, it shall be evident that the memory of the present invention is not limited to the dual port memory. In other words, it is evident that the present invention can be identically or similarly applied to a multi-port memory having two access ports or more.

For example, in a structure of the memory unit 310 coupled commonly to both the main processor 210 and the application processor 220, as shown in FIGS. 3 and 4, the two processors 210 and 220 is structed to use one memory unit 310, thereby necessitating the memory unit 310 to have 2 access ports.

In other words, the two access ports are configured to be identified as a first port 410 and a second port 420, the first port 410 and the second port 420 connecting to the main processor 210 and the application processor 220, respectively. Each of the main processor 210 and the application processor 220 can use an independent clock. In FIG. 4, "Addr" refers to an address signal, "Data" a data bus, "Cttl" a control signal. The control signal can include Clock, Write Enable and Chip Select.

The storage block of the memory unit 310 can be partitioned to partitions corresponding to the number of processors coupled to the memory unit 310. This is to allow each processor to access each partition at the same time to write or read data. For example, in case 2 processors are coupled to the memory unit 310, the memory unit 310 can be partitioned to at least 2 blocks (i.e. a first storage block 440 and a second storage block 460), and each of the partitioned blocks can be assigned to be dedicated for each processor. Therefore, it is possible that each processor accesses the storage block, assigned to be dedicated for the processor, through the assigned port to write/read the data.

Although the memory unit 310 can not be simultaneously accessed by a plurality of processors 210 and 220, the memory unit 310 can be partitioned to further comprise a common storage block 450 that can be accessed by each processor at different times. In other words, the common storage block 450 can be individually accessed as long as it is not assigned to be a dedicated block for a specific processor and it is not simultaneously accessed. This is to maintain the temporal consistency of the data consecutively by setting a process to be completed before the next process starts. Of course, the memory unit 310 can be partitioned to 3 or more blocks even though only 2 processors are coupled to the memory unit 310.

The size of the partitioned block (i.e. the first storage block 440, the common storage block 450 aid the second storage block 460) of the memory unit 310 can be configured to be predetermined by default, partitioned to a certain size by the main processor 210 and/or the application processor 220 or varied whenever necessary (for example, when the data to be written is bigger than the writable area) by the main processor 210 and/or the application processor 220.

In other words, the address information on the partitioned blocks of the storage blocks of the memory unit 310 can be set and managed by the main processor 210, and the address information set by the main processor 210 is provided to the application processor 220 for sharing. Of course, the address information can also be set and managed by the application processor 220. As necessary, any one of the processors 210 and 220 can have an address setting authority to supply the set address information to the other processor 220 or 210, to thereby have the address information shared.

In this case, the information on the partitioned blocks of the memory unit 310 can be recognized by each processor when the portable terminal is booted.

The blocks can be partitioned in units of bank in case the memory is an SDRAM. An SDRAM usually comprises an RAS address, a CAS address and a Bank address.

Since dividing the storage block of the memory unit 310 into a plurality of partitioned blocks in units of internal blocks is most ideal, 3 banks, for example, can be assigned to the first storage block 440, and the common storage block 450 and the second storage block 460 can be assigned with one bank each as shown in FIG. 5. Of course, the different number of the bank can be set to be assigned to each storage block or can be varied.

As shown in FIG. 5, the common storage block 450 is partitioned into a plurality of sub partitioned blocks. A use can be individually prededicated at every sub partitioned block. For example, the common storage block 450 is partitioned into 4 sub partitioned block (e.g. S8 through S4). The S1 stores the video data of multimedia data; the S2 stores the audio data thereof, the S3 stores the 3-D graphic data thereof, and the S4 stores the data transmitted to the display 250. In this case, a processing operation corresponding to each of the sub partitioned blocks can be set. For example, the data stored in the S1 can be decoded and sent to the display 250, and the data stored in the S4 can be sent to the display 250 without an additional processing operation.

In case the common storage block 450 is partitioned into the plurality of sub partitioned blocks, an independent bank address can be assigned to each of the sub partitioned blocks. For example, the bank address such as BA0 and BA1 can be assigned to each bank. The bank address such as COM_BA0, COM_BA1, COM_BA2 and COM_BA3 can be assigned to each of the sub partitioned blocks of the common storage block 450.

The main processor 210 can store the data, to be sent to the application processor 220, in the corresponding sub partitioned block of the common storage block 450, and then, can transmit the corresponding control command to the application processor 220 through the host interface. The control command can be a process instructing command, which can have a bank address, for instructing to process the data stored in a particular sub partitioned block by a preset processing operation, In this case, although the corresponding bank address only is transmitted to the application processor 220, since the application processor 220 has already recognized which processing operation is performed for each of the sub partitioned blocks, the application processor 220 can perform the corresponding processes without detailed process instructing command.

Alternatively, the control command can be transmitted by a method that the main processor 210 writes a value in a block pointing register, equipped in the application processor 220. For example, the main processor 210 can write '00' in the block pointing register for the video data written in an assigned sub partitioned block of the common storage block 450, '01' for the audio data, '10' for the 3-D graphic data and '11' for the data to be displayed. In this case, even though the main processor 210 sends no additional bank address to the application processor 220, the application processor 220 can recognize in which sub partitioned block the data to be processed is stored and which processing operation the data undergoes by reading the value only stored in the block pointing register.

In aforementioned embodiments, however, the application processor 220 accesses a sub partitioned block and carries out corresponding data processing operation after the main processor 210 terminates accessing the sub partitioned block. The method of determining whether the main processor 210 terminates its access to the sub partitioned block will be described in detail.

Since the common storage block 450 is restricted to be accessed by the maximum of one processor only at any time, one of the main processor 210 and the application processor 220 must provide to the other processor the information on the access to the common storage block 450.

The memory unit 310 can comprise a memory control unit 430, which performs address decoding and control functions to allow the shared memory to operate according to the control signal received from any processor.

Below is the description, with reference to an example, of a method for delivering access attempt/request or access status, to access the common storage block 450, from one processor to the other processor.

First, when the main processor 210 attempts to access the common storage block 450 of the memory unit 310, the main processor 210 must notify the attempt to the application processor 220 via the host interface. For this, the application processor 220 must pre-comprise a register (P-reg) for writing the information corresponding to this notification.

In other words, when the main processor 210 attempts to access the common storage block 450 (or a sub partitioned block, and hereinafter), the main processor 210 renews the register value in the application processor 220 to a predetermined first value (e.g. "1") via the host interface. In this case, the main processor 210 can write in the block pointing register a value corresponding to the type of the data to be written in the common storage block 450. Then, if the application processor 220 is not accessed to the common storage block 450, the main processor 210 attempts to access the common storage block 450. In this case, since the main processor 210 has already notified that it would access the common storage block 450, the application processor 220 does not attempt to access the common storage block 450 until the main processor 210 terminates its access to the common storage block 450. After terminating the access to the common storage block 450, the main processor 210 renews the pertinent register value to a predetermined second value (e.g. "0").

There can be a problem, however, if the application processor 220 is already accessed to the common storage block 450 when the main processor 210 renews the pertinent register value to the first value. In this case, the application processor 220 determines whether to transfer the privilege to access the common storage block 450 after the processing operation finishes the pertinent operation in accordance with the predetermined priority information or to transfer the access privilege after unconditionally stopping the pertinent operation. The steps of transferring the access privilege by the application processor 220 can be predetermined and are well known to those of ordinary skill in the art, and thus the detailed description thereof will not be provided here.

Next, when the application processor 220 attempts to access the common storage block 450 of the memory unit 310, the main processor 210 must be notified of this through the host interface. For this, an interrupt signal transmission pin can be included in the pins for the host interface.

In other words, when the application processor 220 attempts to access the common storage block 450, the application processor 220 transmits an interrupt signal to the main processor 210 through the host interface, Then, if the main processor 210 is not accessed to the common storage block 450, the application processor 220 attempts to access the common storage block 450. In this case, since the application processor 220 has already notified that it would access the common storage block 450, the main processor 210 does not attempt to access the common storage block 450 until the application processor 220 terminates its access to the common storage block 450. After terminating the access to the common storage block 450, the application processor 220 transmits an access termination signal through the host interface.

There can be a problem, however, if the main processor 210 is already accessed to the common storage block 450 when the application processor 220 renews the pertinent register value to the first value. In this case, the main processor 210 determines whether to transfer the privilege to access the common storage block 450 after the processing operation finishes the pertinent operation in accordance with the predetermined priority information or to transfer the access privilege after unconditionally stopping the pertinent operation. The steps of transferring the access privilege by the main processor 210 can be predetermined and are well known to those of ordinary skill in the alt, and thus the detailed description thereof will not be provided here.

In the case described so far, while one of the processors has requested the access to the common storage block, the processor requesting the access has the priority if the other processor is still not accessed to the common storage block 450. However, it shall be evident that, while one of the processors has requested the access but has not attempted to make the access, the other processor attempting to carry out an operation of higher priority can have the operation carried out first by transmitting an access stop request to the processor that requested the access. In this case, even though the processor requested the access first, the processor stops its access to the common storage block 450 until the operation of higher priority is completed. The priority of operation can be predetermined, and can be recognized by each processor or controlled by the main processor 210. There also can be various other methods.

Below is a brief description of the pin structure for the host interface between the main processor 210 and the application processor 220.

According to the memory sharing structure of the present invention, it is not necessary that the main processor 210 and the application processor 220 directly communicate data between each other. This is because transferring the privilege to access the common storage block 450 would be enough. In other words, for the data necessary to be communicated between the main processor 210 and the application processor 220, the processor that needs to deliver the data accesses the common storage block 450 and writes the data before terminating the access. Then, the processor that needs to use the stored data accesses the common storage block 450 and reads and processes the data.

Therefore, the number of pins used in the host interface for communicating information between the main processor 210 and the application processor 220 can be minimized. To minimize the number of pins in the host interface, a serial interface can be used.

The following table 1 shows the pins necessary for the host interface.

TABLE 1

| Signal | Description |
|---|---|
| S_data_out | MP(Main Processor) data out to AP(Application Processor) |
| S_data_in | AP(Application Processor) data out to MP(Main Processor) |
| S_CLK | Serial data synchronous clock |
| S-Enable | Define enable period |
| Interrupt | AP(Application Processor) output to MP(Main Processor) to get something |

The main processor 210 can use the S_data_out signal to transmit a control command (e.g. a control signal, process instruction, etc.) to the application processor 220. The application processor 220 can use the S_data_in signal to transmit a response signal (e.g. Ack, process completion response, etc.) to the main processor 210 or to check the operation/setting status of the main processor 210/application processor 220. The S_CLK signal can be used as the clock for synchronizing with serial data for serial communication. The S_enable signal can be used to indicate the section of communication by valid data for communication. The Interrupt signal can be used to notify the main processor 210 at a point when, for example, the application processor 220 attempts to access the common storage block 450.

Figure 6:
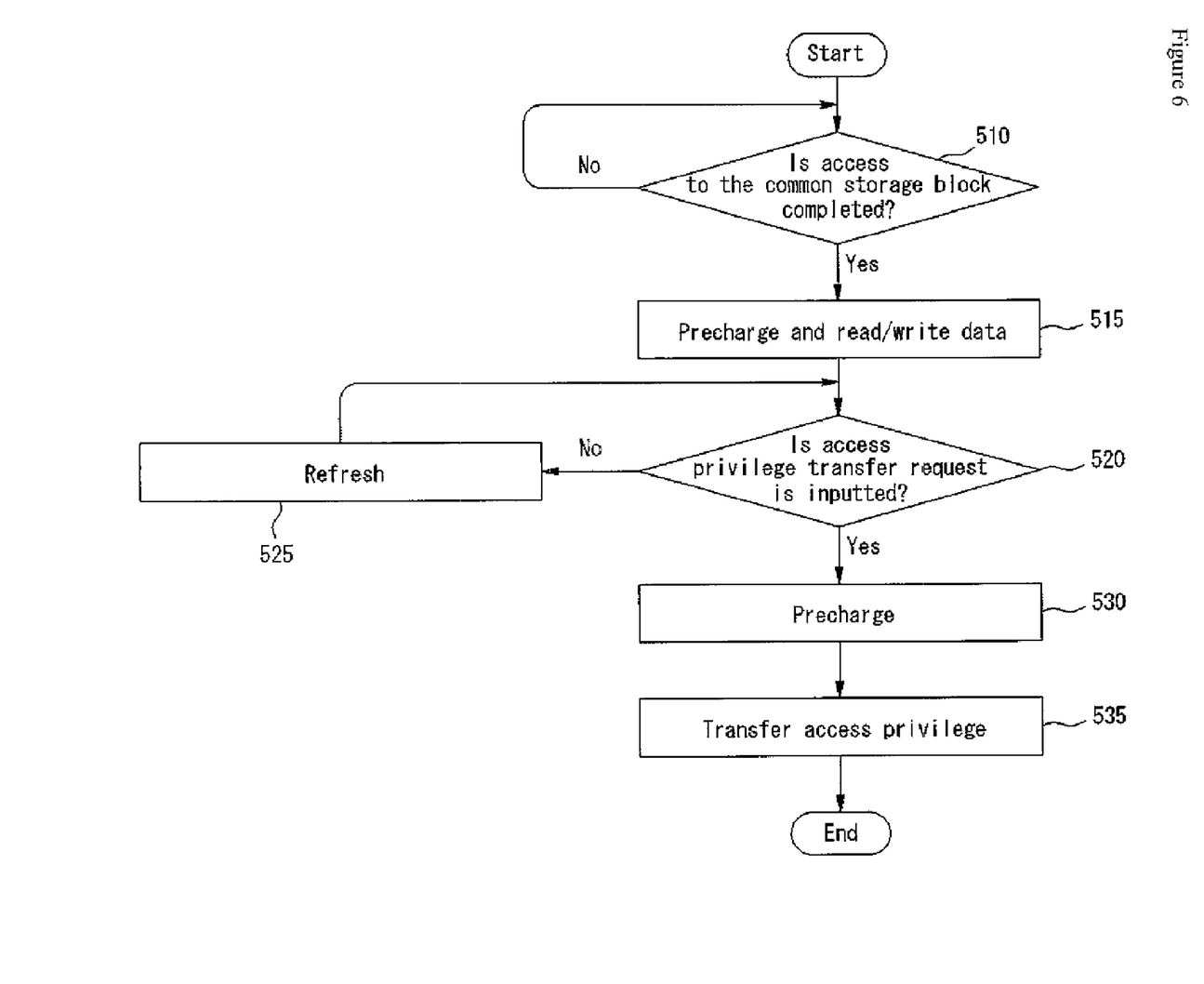
FIG. 6 shows a flow chart of a process for transferring a privilege to access a common storage block in accordance with an embodiment of the present invention.
Figure 7:
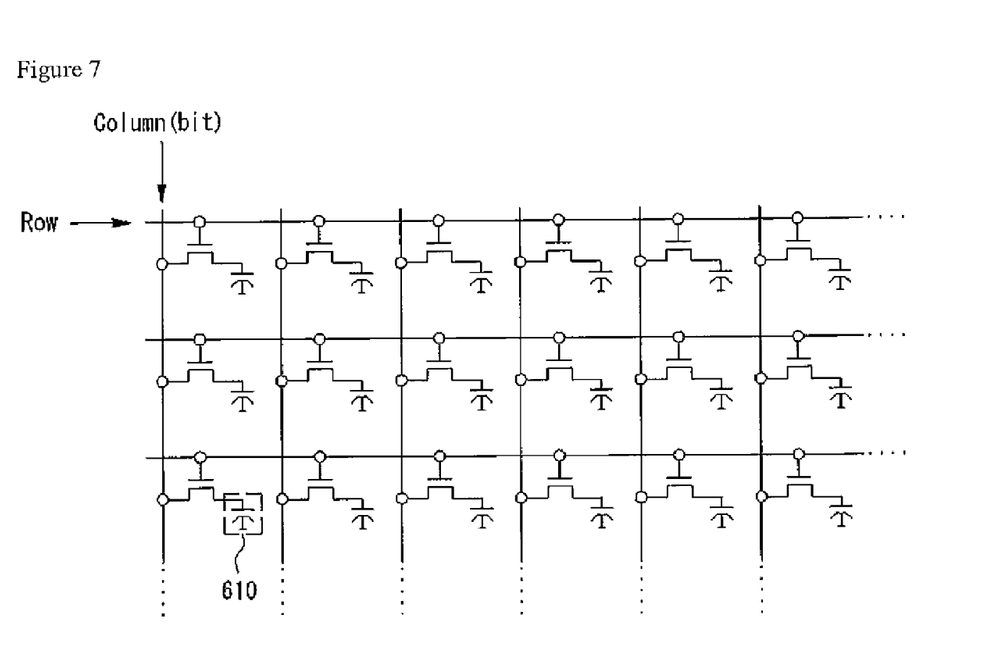
FIG. 7 shows the basic structure of an SDRAM in accordance with an embodiment of the present invention.

FIG. 6 is a flow chart for the steps of transferring the privilege to access the common storage block in accordance with an embodiment of the present invention, and FIG. 7 is the basic structure of an SDRAM in accordance with an embodiment of the present invention.

In other words, FIG. 6 shows the steps that one of the processors accesses the individually accessible common storage block 450 to carry out a necessary operation and then transfers the access privilege to the other processor, unless the main processor 210 and the application processor 220 simultaneously access the common storage block 450.

Below are the steps of a first processor (i.e. one of the main processor 210 and the application processor 220), accessed to the common storage block 450 first, transferring the access privilege to a second processor (i.e. the other of the main processor 210 and the application processor).

Referring to FIG. 6, in step 510, the first processor determines whether the access to the common storage block 450, of the partitioned storage blocks of the memory unit 310, is completed. The first processor carries out the refresh operation until it accesses the common storage block 450 in order to prevent the data stored in the block from being deleted.

Before the first processor access the common storage block 450, the first processor must predetermine whether the second processor is accessed to the common storage block 450 already. Thus, the first processor accesses the common storage block 450 while the second processor is not accessed to the common storage block 450 or after the second processor terminates its access to the common storage block 450.

In addition, the first processor must notify the second processor before the first processor accesses the common storage block 450. If the first processor is the main processor 210, the first processor will renew the register value, which is present in the application processor 220, to a first value (e.g. "1") through the host interface. If the first processor is the application processor, the first processor will send an interrupt signal to the main processor 210 through the host interface. Through this, the second processor can recognize that the first processor would access the common storage block 450. In this case, if the second processor is already accessed to the common storage block 450, it is determined whether to stop the current operation immediately and transfer the access privilege in accordance with a predetermined priority or to stop the current operation first and transfer the access privilege. For example, when the main processor 210 is writing the data (e.g. the data stored in the S4 of sub partitioned blocks in FIG. 5), to be immediately displayed through the display 250, in the common storage block 450, if the main processor 210 is requested by the application processor 220 to transfer the access privilege (i.e. the interrupt signal is received), the main processor 210 will complete the operation and then transfer the access privilege to the application processor 220. In this case, the application processor 220 will transfer the data written in the common storage block 450 to display 250 according to predetermined processing operation. However, when the main processor 210 is writing in the common storage block 450 the data to be later displayed through the display 250, if the main processor 210 is requested by the application processor 220 to transfer the access privilege, the main processor 210 will be able to immediately stop the corresponding operation and then transfer the access privilege. For example, in case the portable terminal is a mobile communication terminal, the execution of telephone functionality can have the highest priority.

In step 515, the first processor precharges and reads/writes data.

In general, an SDRAM has 4 independent banks. As shown in FIG. 7, each bank is filled with cells, which are the units of storing data within the lattice, identified by rows and columns. Each cell has capacitors 610 for charging data.

The corresponding row on the bank for data access is opened by an "activate" command for writing and reading. After the activation requiring 2 to 4 cycles, the data transmission begins by transmitting the read command or write command along with the column address. After the transmission, the bank inactivates the opened row and is precharged to prepare for the next "activate" command. The precharge command closes the opened row. Although the present invention describes that the shared memory is an SDRAM, it shall be evident that the present invention can be equivalently applied to a dynamic RAM (e.g. DDR-RAM, SLDRAM and RDRAM).

In step 520, the first processor determines whether the access privilege transfer request is inputted from the second processor.

As described earlier, if the second processor is the main processor 210, the second processor will renew the pre-assigned register value, which is present in the application processor 220, to the first value (e.g. "1") through the host interface. If the second processor is the application processor 220, the second processor will transmit the interrupt signal to the main processor 210 via the host interface. The remaining steps are identical to the steps described above.

If the access privilege transfer request is not inputted from the second processor, the first processor periodically refreshes the access to the common storage block 450.

As described above, unit cells make up a lattice in an SDRAM, and each cell has capacitors 610 for charging the data. For example, if the capacitor 610 is charged, it can be made to be recognized as "1", while the capacitor 610 can be made to be recognized as "0" if it is not charged. That is, after the row is designated, the SDRAM accesses the value of the bits belonging to the row. As shown in FIG. 7, once a row is designated, the CMOS gate becomes open, changing the status of each column according to the quantity of electrical charge on the capacitor. And the value becomes detected to show whether the data is sequentially high or low per bit.

Due to the nature of capacitor, however, the capacitor gets completely discharged if the read operation is continued while the capacitor is not charged, and as a result the data gets deleted. Thus, the refresh operation is periodically performed to prevent this. The memory standard prescribes that a memory module be refreshed every 64 milliseconds.

However, if the access privilege transfer request is inputted from the second processor, step 530 is performed to have the first processor precharges the common storage block 450 again before transferring the privilege to access the common storage block 450 to the second processor. This is because there is a possibility of getting the data deleted while transferring the access privilege since the refresh operation is periodically carried out, although the deletion of data is prevented through the periodical refresh operation in step 525.

In step 535, the first processor transfers the access privilege to the second processor. As a result, the first processor terminates the access to the common storage block 450, and the second processor can now access the common storage block 450.

The second processor, to which the access privilege is transferred from the first processor, periodically performs the refresh operation on the common storage block 450 until it accesses the common storage block 450.

As described above, the present invention allows the processor, currently accessed or having the access privilege, to maintain and manage the data stored in the common storage block 450, which is accessible by a plurality of processors. In addition, the data transmission between processors is made possible through the use of the common storage block, enabling a quick delivery of data.

Although the steps of maintaining the data written in the common storage block 450 have been described, anyone skilled in the art shall easily understand that the data written in the first storage block 440 and the second storage block 460, assigned to be exclusively used by each processor, can be individually maintained by the corresponding processor. This is because the first storage block 440 and the second storage block 460 are assigned to be exclusively used by each processor, and are not necessary for one of the processors to transfer the access privilege to the other processor.

Moreover, although the method of having one memory shared by one main processor and one application processor has been described, it shall be evident to those of ordinary skill in the art that the present invention can be equivalently applied to the case of three or more processors sharing one memory. Thus, the pertinent description will be omitted.

As described above, the present invention can minimize the data transmission time between processors, by partitioning the storage area of the shared memory into a plurality of partitioned blocks and allowing the plurality of processors to access each partitioned block.

The present invention also can optimize the data processing/transmission speed and efficiency by allowing storage areas of the shared memory to be partitioned into a plurality of partitioned blocks in units of bank, in the case of a common storage block for a plurality of processors, by allowing the partitioned storage blocks to be partitioned again into sub partitioned blocks depending on a type of data to be stored.

The present invention can also allow each processor to handle its dedicated process to optimize the operation speed and efficiency of each processor by partitioning the storage area of the shared memory into a plurality of partitioned blocks and allowing the plurality of processors to access each partitioned block.

Moreover, the present invention can process data highly efficiently by eliminating the loss of time needed to communicate the data, stored in a specific memory, between processors.

Moreover, the present invention can minimize the number of pins for the connection between the main processor and the application processor. Furthermore, the present invention can easily maintain a data value stored in a common area when a plurality of processors share one memory.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A portable terminal, comprising:
a memory unit, being equipped with at least two ports, and having a common storage block comprising one or more sub partitioned blocks partitioned depending on a type of data to be written;
a main processor, being coupled to a first port of the memory unit through an MP-ME bus; and
an application processor, being coupled to the main processor through a host interface, being coupled to a second port of the memory unit through an AP-ME bus, and performing a corresponding processing of data written in a sub partitioned block according to a control command received from the main processor through the host interface,
wherein the common storage block is assigned to be accessible one of the main processor and the application processor having an access privilege, and
a processing operation according to the type of the data to be written in the sub partitioned block is predetermined,
wherein the main processor transmits a bank address of the sub partitioned block, where the data is written, as the control command to the application processor, immediately before or after writing the data in the sub partitioned block.

2. The portable terminal of claim 1, wherein a data maintaining operation of data written in the common storage block is performed by the processor having the access privilege.

3. The portable terminal of claim 2, wherein the data maintaining operation comprises a precharge and a refresh.

4. The portable terminal of claim 3, wherein the access privilege is transferred between the main processor and the application processor, and any one processor, having the access privilege, of the main processor and the application processor transfers the access privilege to the other processor after performing the precharge.

5. The portable terminal of claim 1, wherein the memory unit further comprises a first storage block, assigned to be dedicated for the main processor, and a second storage block, assigned to be dedicated for the application processor.

6. The portable terminal of claim 5, wherein the common storage block, the first storage block and the second storage block are set in units of bank.

7. The portable terminal of claim 1 or 6, wherein an independent bank address is assigned to each of the sub partitioned blocks.

8. The portable terminal of claim 1, wherein the application processor is equipped with a block pointing register, and the main processor writes a value corresponding to the sub partitioned block, where the data is written, in the block pointing register, immediately before or after writing the data, and the application processor processes the data written in the sub partitioned block according to a preset process.

9. The portable terminal of claim 1, wherein the host interface is a serial interface.

10. The portable terminal of claim 9, wherein pins for the serial interface comprises:
a first pin, communicating the control command between the main processor and the application processor;
a second pin, checking a response signal or a setting status between the main processor and the application processor;
a third pin, for a synchronization clock with serial data;
a fourth pin, indicating a valid data communication section; and
a fifth pin, for the application processor to request the main processor for transfer or assignment of the access privilege.

11. The portable terminal of claim 1, wherein the main processor renews a register value in the application processor to a predetermined value, via the host interface, in order to request transfer or assignment of the access privilege.

12. The portable terminal of claim 1, wherein the processor that is already accessed to the common storage block determines whether to immediately transfer the access privilege in accordance with a predetermined priority or to transfer the access privilege after completing the corresponding process in the case of receiving a request for the transfer of the access privilege from the other processor.

13. A method of sharing a memory between a plurality of processors in a portable terminal, the method comprising:
a main processor obtaining a privilege to access a common storage block, accessing a sub partitioned block of the common storage block to read or write data, and terminating the accessing after completing the read or write of the data;
an application processor, having the access privilege, accessing the sub partitioned block, and reading the data written in the sub partitioned block and processing the read data in accordance with a predetermined processing operation; and
a memory unit, having a plurality of ports to be individually coupled to the main processor and the application processor, having the common storage block, accessible by one of the main processor and the application processor having an access privilege, the common storage block being partitioned into one or more sub partitioned blocks depending on a type of data to be written,
wherein the main processor transmits a bank address of the sub partitioned block, where the data is written, as a control command to the application processor, immediately before or after writing the data in the sub partitioned block, and
the application processor performs the predetermined processing operation corresponding to the data written in the sub partitioned block according to the control command.

14. The method of claim 13, wherein the main processor and the application processor are coupled to each other through a host interface, which is a serial interface.

15. The method of claim 14, wherein pins for the serial interface comprises:
a first pin, communicating a control command between the main processor and the application processor;
a second pin, checking a response signal or a setting status between the main processor and the application processor;
a third pin, for a synchronization clock with serial data;
a fourth pin, indicating a valid data communication section; and
a fifth pin, for the application processor to request the main processor for transfer or assignment of the access privilege.

16. The method of claim 13, wherein the memory unit further comprises a first storage block, assigned to be dedicated for the main processor, and a second storage block, assigned to be dedicated for the application processor, and
the common storage block, the first storage block and the second storage block are set in units of bank, and an independent bank address is assigned to each of the sub partitioned blocks.

17. The method of claim 13, wherein the application processor is equipped with a block pointing register, and the main processor writes a value corresponding to the sub partitioned block, where the data is written, in the block pointing register, immediately before or after writing the data, and the application processor processes the data written in the sub partitioned block according to a preset process.

18. The method of claim 13, wherein a data maintaining operation of the data written in the common storage block is performed by the processor having the access privilege.

* * * * *